(12) United States Patent
Baderdinni et al.

(10) Patent No.: US 9,286,209 B2
(45) Date of Patent: Mar. 15, 2016

(54) SYSTEM, METHOD AND COMPUTER-READABLE MEDIUM USING MAP TABLES IN A CACHE TO MANAGE WRITE REQUESTS TO A RAID STORAGE ARRAY

(71) Applicant: LSI Corporation, San Jose, CA (US)

(72) Inventors: Anant Baderdinni, Lawrenceville, GA (US); Noorshaheen Mavungal Noorudheen, Chavakkad (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 81 days.

(21) Appl. No.: 14/273,812

(22) Filed: May 9, 2014

(65) Prior Publication Data

US 2015/0301934 A1 Oct. 22, 2015

Related U.S. Application Data (60) Provisional application No. 61/981,920, filed on Apr. 21, 2014.

(51) Int. Cl.
G06F 12/00 (2006.01)
G06F 12/02 (2006.01)
G06F 3/06 (2006.01)

(52) U.S. Cl.
CPC .......... *G06F 12/0246* (2013.01); *G06F 3/0619* (2013.01); *G06F 3/0631* (2013.01); *G06F 3/0644* (2013.01); *G06F 3/0688* (2013.01); *G06F 3/0689* (2013.01); *G06F 12/0253* (2013.01); *G06F 2212/1032* (2013.01); *G06F 2212/2022* (2013.01); *G06F 2212/262* (2013.01); *G11B 2220/415* (2013.01)

(58) Field of Classification Search
CPC .............. G06F 3/0689; G06F 11/1092; G06F 12/0866; G06F 2003/0697; G06F 11/1076; G06F 3/0631; G06F 12/0246; G06F 3/0619; G06F 3/0644; G06F 3/0688; G06F 12/0253; G06F 2212/1032; G06F 2212/262; G06F 2212/2022; G11B 2220/415
USPC .................. 711/114, 113, 202, 144
See application file for complete search history.

(56) References Cited

U.S. PATENT DOCUMENTS

| | | | |
|---|---|---|---|
| 8,489,817 B2 | 7/2013 | Flynn et al. | |
| 8,543,742 B2 | 9/2013 | Yu et al. | |
| 2009/0193184 A1 | 7/2009 | Yu et al. | |
| 2012/0131265 A1 | 5/2012 | Koltsidas et al. | |
| 2012/0284587 A1* | 11/2012 | Yu | G06F 3/0608 714/773 |
| 2014/0059278 A1 | 2/2014 | Schuh et al. | |
| 2014/0208062 A1* | 7/2014 | Cohen | G06F 3/0608 711/206 |

* cited by examiner

*Primary Examiner* — Hong Kim (57) ABSTRACT

A RAID storage system serializes data blocks to be stored in a RAID storage array and uses a primary map table and a number of secondary map tables to relate host addresses to logical block addresses in the storage array. Secondary map tables and other metadata can be cached from the storage array. The dual or two-tier map scheme and metadata caching promote scalability.

27 Claims, 9 Drawing Sheets

FIG. 7

SYSTEM, METHOD AND COMPUTER-READABLE MEDIUM USING MAP TABLES IN A CACHE TO MANAGE WRITE REQUESTS TO A RAID STORAGE ARRAY

CROSS-REFERENCE TO RELATED APPLICATION

The benefit of the filing date of U.S. Provisional Patent Application No. 61/981,920, filed Apr. 21, 2014, entitled "FLASH-BASED DATA STORAGE WITH DUAL MAP-BASED SERIALIZATION," is hereby claimed and the specification thereof incorporated herein in its entirety by this reference.

FIELD OF INVENTION

The invention relates generally to data storage systems and, more specifically, to data storage systems in which serialized data is stored in a RAID system.

BACKGROUND

For many years large-scale non-volatile data storage systems were based on arrays of magnetic disk drives. Such systems are increasingly being supplanted by systems based on arrays of flash memory modules. Flash memory is a solid-state, non-volatile storage medium that can be electrically erased and reprogrammed.

One limitation of flash memory is that, although it provides random-access read and programming operations, it does not provide random-access rewrite or erase operations. Rather, flash memory must be erased and then rewritten on a block basis, where a block consists of hundreds or thousands of bits. A flash memory controller can work around this limitation by marking data that is no longer needed as "invalid" and then, at such time as additional storage space may be needed, consolidating the data that is still needed into blocks and rewriting them. Such a process is sometimes referred to as garbage collection. A flash memory controller commonly maintains an address translation table that relates the physical memory address at which data is stored in a flash memory module to a logical address.

Another limitation of flash memory is that repeated erase and reprogramming cycles cause physical degradation of the memory cells. Thus, a memory cell that is erased and reprogrammed more times than another memory cell is likely to fail sooner than the other cell. For this reason, flash memory controllers attempt to distribute writes as evenly as possible across all blocks of cells.

It is important that a host system be able to reliably access all of the data in the data storage system. However, a potential problem that affects data storage systems is that one or more of the devices can fail or malfunction in a manner that prevents the host system from accessing some or all of the data stored on that device. A "redundant array of inexpensive disks" (also known as a "redundant array of independent disks") or "RAID" is a common type of data storage system that addresses the foregoing reliability problem by enabling recovery from the failure of one or more storage devices.

Figure 1:
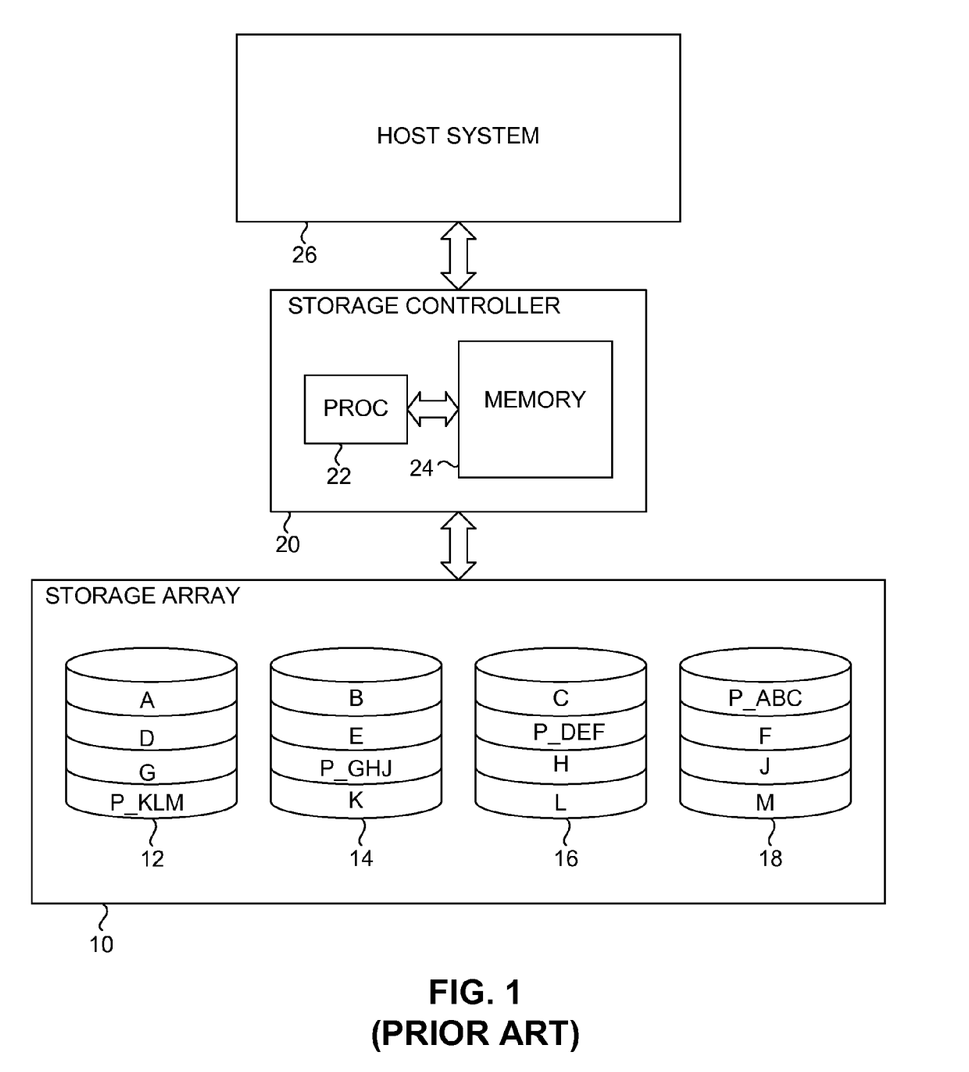
FIG. 1 is a block diagram illustrating a conventional RAID storage system in accordance with the prior art.

Various RAID schemes are known. The various RAID schemes are commonly referred to by a "level" number, such as "RAID-0," "RAID-1," "RAID-2," etc. As illustrated in FIG. 1, a storage array 10 in a conventional RAID-5 system can include, for example, four storage devices 12, 14, 16 and 18 (e.g., arrays of disk drives or flash memory modules). In accordance with the RAID-5 scheme, data blocks are distributed across storage devices 12, 14, 16 and 18. Distributing data blocks across multiple storage devices is known as striping. Parity information for the data blocks distributed among storage devices 12, 14, 16 and 18 in the form of a stripe is stored along with that data as part of the same stripe. For example, RAID storage controller 10 can distribute or stripe data blocks A, B and C across corresponding storage locations in storage devices 12, 14 and 16, respectively, and then compute parity information for data blocks A, B and C and store the resulting parity information P_ABC in another corresponding storage area in storage device 18. The sequential group of storage locations containing data blocks A, B and C and parity block P_ABC is referred to as a stripe.

A RAID data storage system commonly includes a storage controller that controls the manner and locations in which data is written to and read from the storage array. A storage controller can take the form of, for example, a circuit card, such as a PCIe card (Peripheral Computer Interconnect-Express) that plugs into a host computer motherboard. For example, as illustrated in FIG. 1, a storage controller 20 can include a processor 22 and local memory 24. Processor 22 is responsible for computing the parity information. In such computations and other operations, processor 20 utilizes local memory 24. To compute the parity in the foregoing example, processor 22 can read data blocks A, B and C from storage devices 12, 14 and 16, respectively, into local memory 24 and then performs an exclusive disjunction operation, commonly referred to as an Exclusive-Or (XOR), on data blocks A, B and C in local memory 24. Processor 22 then stores the computed parity P_ABC in data storage device 18 in the same stripe in which data blocks A, B and C are stored in data storage devices 12, 14 and 16, respectively.

The RAID-5 scheme employs parity rotation, which means that storage controller 20 does not write the parity information for each stripe to the same one of data storage devices 12, 14, 16 and 18 as the parity information for all other stripes. For example, as shown in FIG. 1, parity information P_DEF for data blocks D, E and F is stored on storage device 16, while data blocks D, E and F are stored in the same stripe as parity information P_DEF but on storage devices 12, 14 and 18, respectively. Similarly, parity information P_GHJ for data blocks G, H and J is stored on storage device 14, while data blocks G, H and J are stored in the same stripe as parity information P_GHJ but on storage devices 12, 16 and 18, respectively. Likewise, parity information P_KLM for data blocks K, L and M is stored on storage device 12, while data blocks K, L and M are stored in the same stripe as parity information P_KLM but on storage devices 14, 16 and 18, respectively.

In database systems, the order or sequence in which input/output or "I/O" operations occur is commonly random, i.e., not inherently predictable by systems external to a host system 26 (e.g., a computer). Host system 26, in association with issuing a write request, does not in every instance request that storage array 10 write a data block to a logical block address (LBA) immediately following an LBA to which host system 26 requested a data block be written in association with the immediately preceding write request. In the example shown in FIG. 1, the logical sequence of data blocks is indicated alphabetically, such that the LBA or logical storage location of data block B in storage array 10 immediately follows the LBA or logical storage location of data block A, the LBA or logical storage location of data block C immediately follows the LBA or logical storage location of data block B, etc. Therefore, host system 26 may, for example, issue a write request requesting that data block B be written to storage array 10 before host system 26 issues a write request requesting that data block A be written to storage array 10. Each time storage controller 20 writes a data block to a stripe in storage array 10, storage controller 20 must update the parity block of that stripe in the above-described manner, e.g., employing a read-modify-write operation in which processor 22 reads data blocks A, B and C from storage devices 12, 14 and 16, respectively, into local memory 24, then computes parity block P_ABC, and stores the computed parity block P_ABC in data storage device 18.

It is known to employ a data serialization feature in data storage systems so that data and parity blocks are written in a single "full-stripe" write operation. A full-stripe write feature can avoid the inefficiency or overhead stemming from the above-described read-modify-write operation. In a storage controller 20 employing a full-stripe write feature, storage controller 20 serializes data to be written to storage devices 12, 14, 16 and 18. That is, data is not written to a stripe until all of the data blocks and the parity block of that stripe are ready to be written to storage array 10. Then, storage controller 20 writes the data blocks and parity block together as a full stripe. For example, storage controller 20 can store data blocks A, B and C in memory 24, which serves as a cache, until all of data blocks A, B and C have been received from host system 26. Then, storage controller 20 can computer the parity block P_ABC and sequentially or serially write the blocks stripe consisting of data blocks A, B and C and parity block P_ABC.

In a system in which storage devices 12, 14, 16 and 18 comprise flash memory, employing a full-stripe write feature not only provides a performance benefit by avoiding a read-modify-write operation but also inhibits degradation of the flash memory cells by distributing write operations more evenly across the cells. In a storage controller 20 employing a full-stripe write feature, storage controller 20 manages an address translation table (not shown) to translate between the host addresses, i.e., the addresses that host 26 includes in write requests, and the storage locations or addresses at which the data blocks are ultimately stored in storage array 10. Processor 22 commonly retrieves the address translation table into memory 24 in portions, on an as-needed basis, from storage array 10. When storage controller 20 stores data in storage array 10 or otherwise modifies data in storage array 10, processor 22 modifies the relevant portion of address translation table accordingly.

SUMMARY

Embodiments of the invention relate to a RAID data storage system and method of operation. In an exemplary embodiment, the system includes a cache memory and a processing system that is programmed or configured to effect the method.

In an exemplary embodiment, the method includes: receiving a write request including a host address and a data block; identifying a primary map table entry in response to the host address, wherein the primary map table has a plurality of primary map table entries, and each primary map table entry identifies one of a plurality of secondary map tables; identifying a secondary map table in response to an identified primary map table entry identified by the host address, wherein each secondary map table has a plurality of secondary map table entries, and each secondary map table entry identifies a storage location in the RAID storage array; identifying an indicated secondary map table entry in response to the host address; serializing the write request into a RAID stripe including the data block; storing a block address in the identified secondary map table entry; and writing the RAID stripe including the data block to the RAID storage array, the block address stored in the identified secondary map table entry indicating a location of the data block in the RAID storage array.

WRITTEN DESCRIPTION

Figure 2:
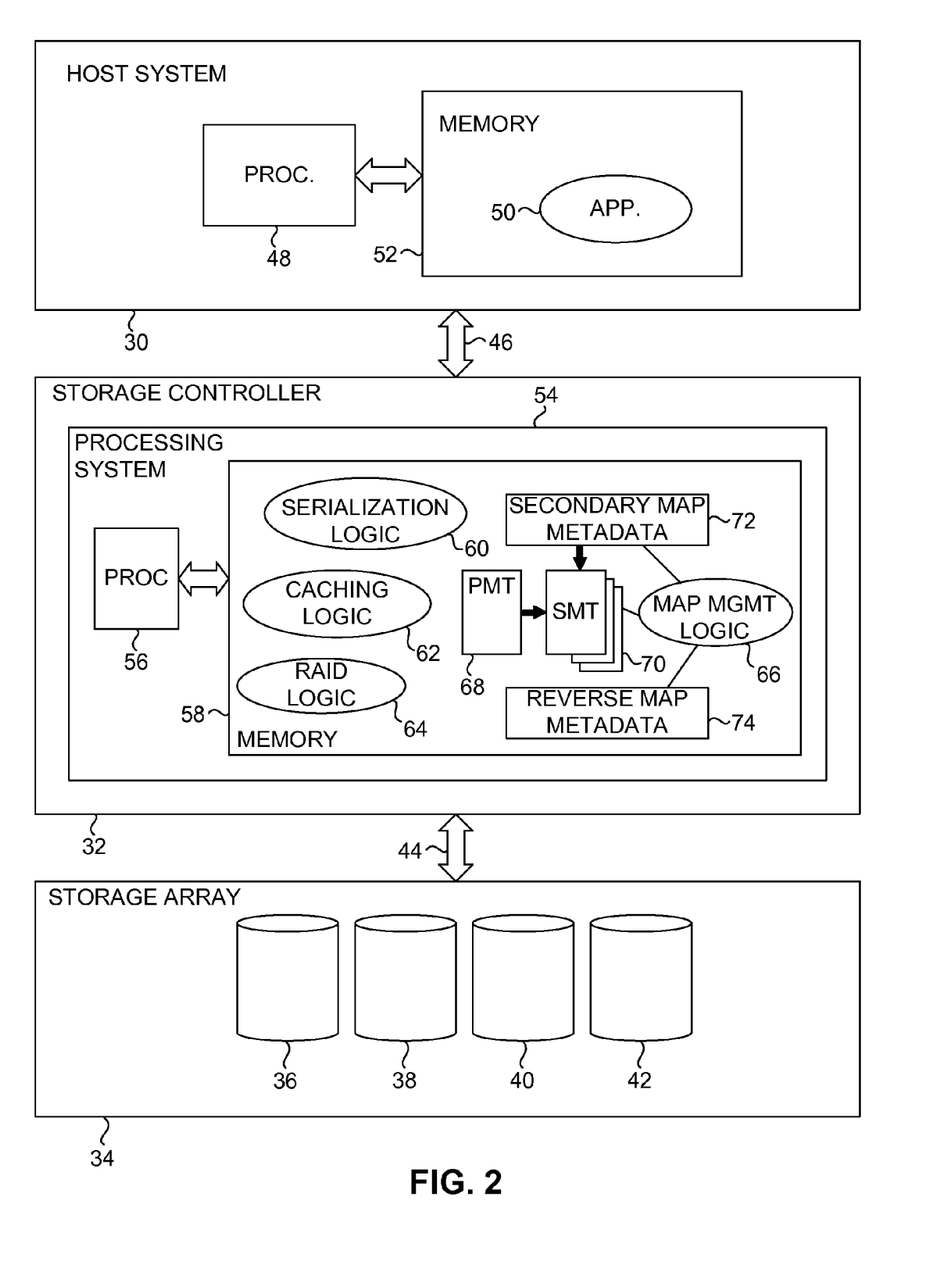
FIG. 2 is a block diagram illustrating a RAID storage system in accordance with an exemplary embodiment of the invention.

As illustrated in FIG. 2, in an illustrative or exemplary embodiment of the invention, a host system 30 communicates with a data storage controller 32 that controls data storage in a RAID manner in a storage array 34. Storage array 34 includes four storage devices 36, 38, 40 and 42, such as flash memory modules or arrays of flash memory modules. Although in the exemplary embodiment storage devices 36, 38, 40 and 42 comprise flash memory modules rather than disks, they also can be referred to for convenience as "physical disks" or "PDs" in keeping with conventional RAID terminology. That the number of storage devices in storage array 34 is four is intended merely as an example, and in other embodiments such a storage array can include any number of storage devices. Although not described in detail herein for purposes of clarity, it should be understood that storage controller 32, in addition to operating as described below, operates to provide substantially conventional RAID protection, such as, for example, RAID-5 protection, to storage array 34. As well understood in the art, RAID-5 (striping with rotated parity) can be used to protect a storage array having three or more storage devices.

Storage controller 32 communicates with storage array 34 via an interface 44, such as a bus, and also communicates with host system 30 (e.g., a computer) via another interface 46, such as another bus. Storage controller 30 can be physically embodied in a circuit card device that is, for example, pluggable into a motherboard or backplane (not shown) of host system 30. For example, storage controller 32 can have characteristics of a PCIe controller, where interface 46 is a PCIe bus.

Host system 30 stores data in and retrieves data from storage array 34 via storage controller 32. That is, a processor 48 in host system 30, operating in accordance with an application program 50 or similar software, initiates input/output ("I/O") requests for writing data to and reading data from storage array 34. Note that although application program 50 is depicted in a conceptual manner for purposes of clarity as stored in or residing in a memory 52, persons skilled in the art can appreciate that such software (logic) may take the form of multiple pages, modules, segments, programs, files, instructions, etc., which are loaded into memory 52 on an as-needed basis in accordance with conventional computing principles. Similarly, although memory 52 is depicted as a single element for purposes of clarity, memory 52 can comprise multiple elements. Likewise, although processor 48 is depicted as a single element for purposes of clarity, processor 48 can comprise multiple processors or similar processing elements.

Storage controller 32 includes a processing system 54 comprising a processor 56 and memory 58. Memory 58 can comprise, for example, synchronous dynamic random access memory (SDRAM). Although processor 56 and memory 58 are depicted as single elements for purposes of clarity, they can comprise multiple elements. Processing system 54 includes the following logic elements: serialization logic 60, caching logic 62, RAID logic 64, map management logic 66, a primary map table ("PMT") 68, a plurality of secondary map tables ("SMTs") 70, secondary map metadata 72, and reverse map metadata 74. These logic elements or portions thereof can program or otherwise configure processing system 54 to effect the methods described below. The term "logic" or "logic element" is broadly used herein to refer to control information and data, including, for example, instructions, data structures, files, tables, etc., and other logic that relates to the operation of storage controller 32. Note that although the above-referenced logic elements are depicted in a conceptual manner for purposes of clarity as stored in or residing in memory 58, persons of skill in the art can appreciate that such logic elements may take the form of multiple pages, modules, segments, programs, files, instructions, etc., which can be loaded into memory 58 on an as-needed basis in accordance with conventional computing principles as well as in a manner described below with regard to caching or paging methods in the exemplary embodiment. Unless otherwise indicated, in other embodiments such logic elements or portions thereof can have any other suitable form, such as firmware or application-specific integrated circuit (ASIC) circuitry.

Figure 3:
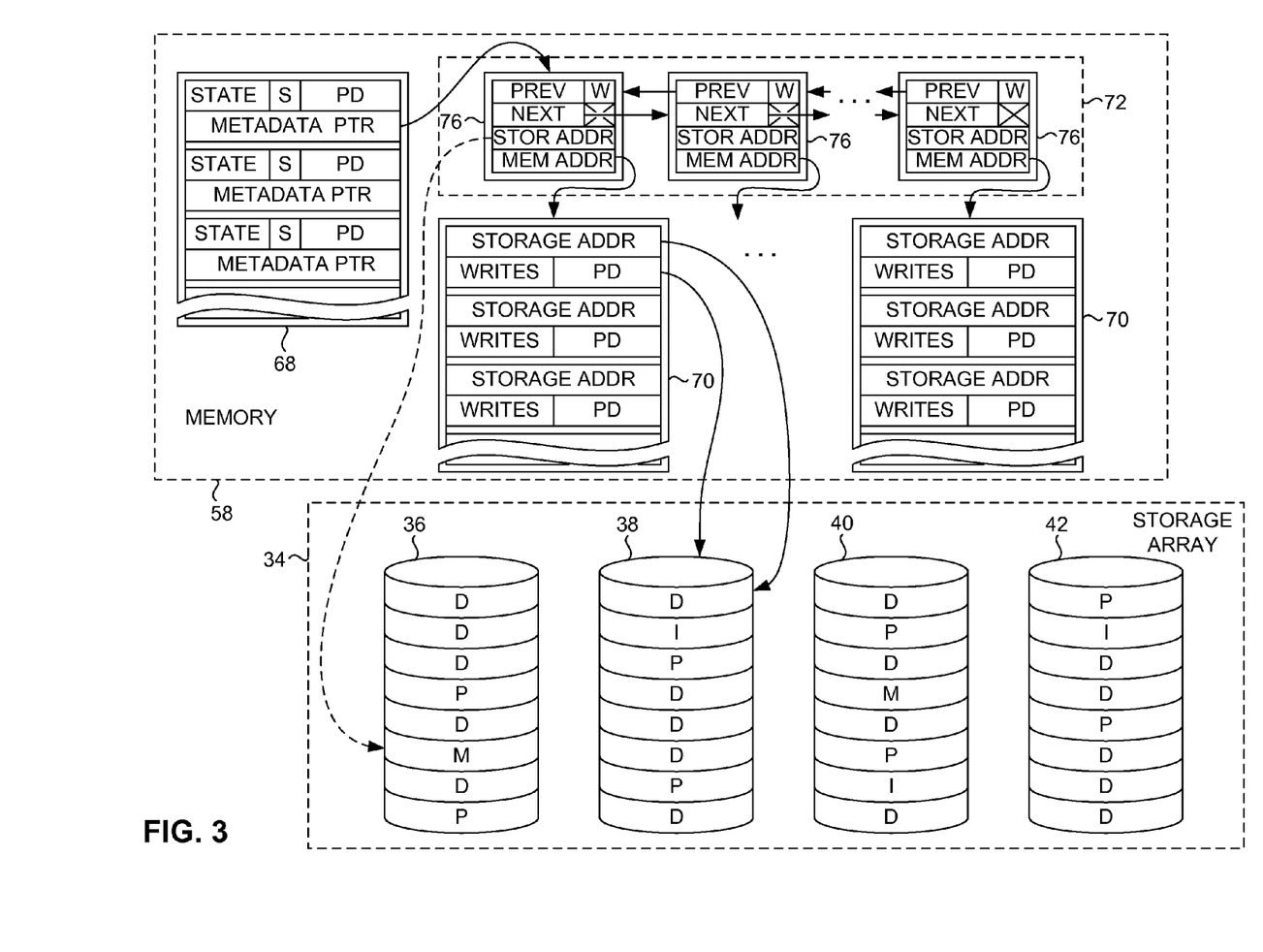
FIG. 3 is a block diagram illustrating data structures in cache memory and the storage array of the system of FIG. 2.

As illustrated in FIG. 3, PMT 68 includes a plurality of PMT entries. Each PMT entry corresponds to one of the SMTs 70. Each PMT entry comprises two words: a first word having a state field ("STATE") for containing state information that identifies whether PMT 68 includes a valid entry or has not previously been updated, an stored-in-memory flag field ("S") for containing a stored-in-memory flag to indicate whether the corresponding SMT 70 is cached in memory 58, and a physical disk identifier field ("PD") for containing a physical disk identifier that identifies one of storage devices 36, 38, 40 and 42; and a second word comprising a metadata pointer field ("METADATA PTR") for containing a metadata pointer. A metadata pointer is an address offset that indicates a location or address at which secondary map metadata 72 for the corresponding SMT 70 is stored, either in memory 58 or in storage array 34. The PMT 68 can have any number of PMT entries, such as, for example, 128k. It can be noted that the term "word" as used herein refers to an ordered group of contiguous bits, such as, for example, 32 bits. The term "block" is used herein to refer to a group of contiguous words, such as, for example, 8k words. The term "page" may also be used to refer to such a group of contiguous words, particularly in the context of a paging or caching method.

Secondary map metadata 72 includes a data structure comprising a plurality of SMT metadata nodes 76 organized as a doubly linked list. Each SMT metadata node 76 corresponds to one SMT 70. Each metadata pointer contained in a PMT entry in PMT 68 points to one of SMT metadata nodes 76. Thus, in an exemplary embodiment in which PMT 68 includes 128k entries, secondary map metadata 72 includes 128k SMT metadata nodes 76 and, correspondingly, 128k SMTs 70. As described below, SMTs 70 can be retrieved from storage array 34 into memory 58 on an as-needed basis in accordance with a caching method. Thus, in such an embodiment all 128k SMTs 70 need not reside simultaneously in memory 58. For purposes of clarity, only two exemplary SMTs 70 are shown in FIG. 3; further SMTs 70 that are in memory 58 but not shown, as well as further SMT metadata nodes 76 that are in memory 58 but not shown, are indicated by the ellipsis (" . . . ") symbol in FIG. 3.

Each SMT metadata node 76 comprises four words: a first word having a dirty-write flag field ("W") to contain a flag indicating that a data block cached in memory 68 has not yet been written to storage device 34 and having a previous-node field ("PREV") to contain a pointer to a previous SMT metadata node 76 in the linked list; a second word having a next-node field ("NEXT") to contain a pointer to a next SMT metadata node 76 in the linked list; a storage address ("STOR ADDR") field to contain an address in storage device 34 that can be used to access the corresponding SMT 70 so that it can be retrieved into memory 58; and a memory address field ("MEM ADDR") to contain a pointer to an SMT 70 that has been retrieved into memory 58.

Figure 4:
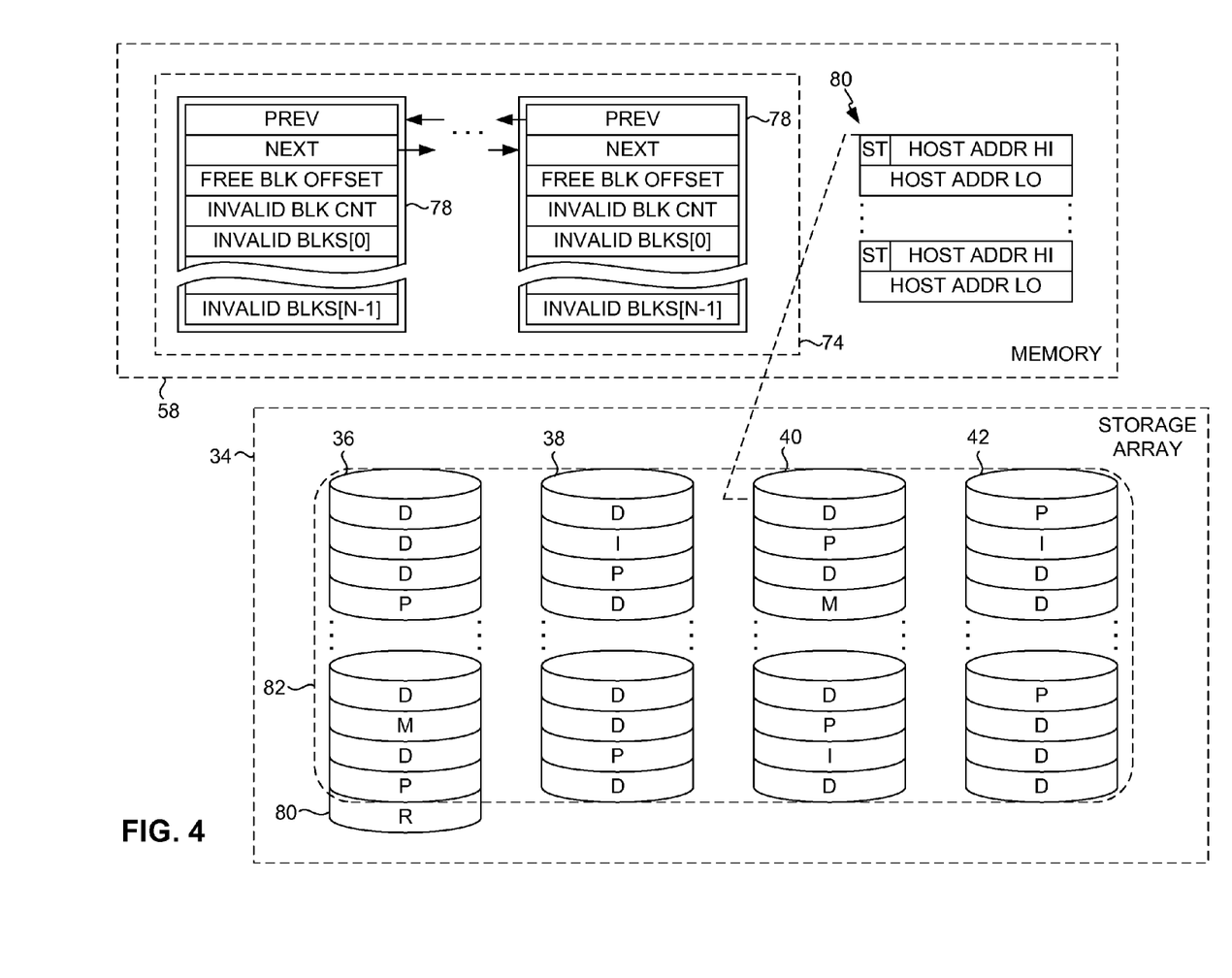
FIG. 4 is another block diagram illustrating further data structures in cache memory and the storage array of the system of FIG. 2.

It should be noted that SMTs 70 are stored in storage array 34 as another type of metadata. In the context of information stored in storage array 34, this type of metadata ("M") is any information other than data blocks ("D") and parity blocks ("P"). It should be noted that the locations in storage array 34 in which data blocks, parity blocks, metadata blocks, and invalid blocks ("I") are shown in FIGS. 3 and 4 are intended only to be exemplary or for purposes of illustration; such blocks can be located in any manner consistent with the descriptions herein. In FIG. 3, a broken-line arrow indicates an example of a storage address being used to access a corresponding SMT 70 stored as metadata in storage device 36 of storage array 34. Similarly, the solid-line arrows in FIG. 3 indicate examples of information being accessed using other addresses or pointers.

Each SMT 70 comprises a plurality of SMT entries (which can also be referred to as SMT pages or SMPs). Each SMT entry corresponds to a data block. For example, in the exemplary embodiment each SMT can comprise 1,024 or 1k SMT entries. Each SMT entry comprises two words: a first word having a storage address field ("STORAGE ADDR") for containing an address in storage device 34 that can be used to access the corresponding data block; and a second word having a physical disk field ("PD") for containing an indication of which of the storage devices 36, 38, 40 and 42 the corresponding data block is stored, and having a number-of-writes field ("WRITES") for containing a count of the number of pending writes.

As illustrated in FIG. 4, reverse map metadata 74, which is also present in memory 58, comprises a data structure having plurality of reverse map tables (RMTs) 78 organized as nodes of a doubly linked list. Each RMT 78 comprises the following words: a previous-node word ("PREV") for containing a pointer to a previous RMT 78 in the linked list; a next-node word ("NEXT") for containing a pointer to a next RMT 78 in the linked list; a free block offset word ("FREE BLK OFFSET") for containing an offset within an RMP region (described below) indicating the location to which the next write request is to be written; an invalid block count word ("INVALID BLK CNT") for containing a count of the number of data blocks marked as invalid; and a plurality of N words ("BLKS[0:N−1]") that together define an invalid-block bit map indicating the locations of the invalid data blocks in storage array 34. There can be any number N of such invalid bit map words, such as, for example, 32. Each bit location in each invalid bit map word corresponds to one storage location in storage array 34.

One or more reverse map pages (RMPs) 80 can also be present in memory 58. Each RMP 80 comprises a plurality of RMP entries. For example, in the exemplary embodiment each RMP 80 can have 1,024 RMP entries. Each RMP entry comprises two words: a first word having a state field ("ST") for containing state information such as an indication whether a data block is in memory 58 or in storage array 34, etc., and having a high-order host address field ("HOST ADDR HI") for containing the high-order bits of a host address; and a second word having a low-order host address field ("HOST ADDR LO") for containing the low-order bits of the host address.

Each RMP entry corresponds to a data block stored in storage array 34. The host address contained or stored in an RMP entry indicates the address at which the host system 30 (FIG. 2) requested the corresponding data block be stored. However, due to the serialization feature described below, storage controller 32 stores data blocks in locations in storage array 34 that do not correspond to the host address. As described below, RMPs 80 are used in a recycling method to free up space in storage array 34 occupied by data blocks that have been marked as invalid. An RMP entry can be used to obtain the host address for a data block to be moved from one storage location to another in storage array 34 as part of the recycling method.

Storage devices 36-42 of storage array 34 are shown in FIGS. 3 and 4 having storage locations containing data blocks ("D"), parity blocks ("P"), metadata blocks ("M") and invalid blocks ("I"), as well as RMPs 80. Although the sequence or pattern in which such blocks are shown in FIGS. 3 and 4 is merely exemplary, it can be noted that in accordance with conventional RAID-5 principles, each stripe across storage devices 36, 38, 40 and 42 that includes data blocks also includes one parity block. Note that in accordance with RAID-5, the parity blocks are "rotated" such that the parity block for a stripe is not stored in the same one of storage devices 36-42 as the parity block for an adjacent stripe but rather in an adjacent one of storage devices 36-42.

Each RMP 80 corresponds to an RMP region 82 (FIG. 4) comprising contiguous storage locations in storage array 34 containing some combination of data blocks, parity blocks, metadata blocks, and invalid blocks. As each RMP 80 has 1,024 RMP entries in the exemplary embodiment, each RMP region 82 accordingly comprises 1,024 contiguous storage locations in storage array 34. In the exemplary embodiment, each RMP 80 is stored in a location in storage array 34 immediately following to its corresponding RMP region 82. Also, RMPs 80 are rotated in the manner of parity blocks. Thus, while FIG. 4 shows the exemplary RMP 80 for RMP region 82 stored in storage device 36, another RMP 80 (not shown) for another RMP region (not shown) adjacent to RMP region 82 would not be stored in storage device 36 but rather would be stored in, for example, storage device 38.

Figure 5A:
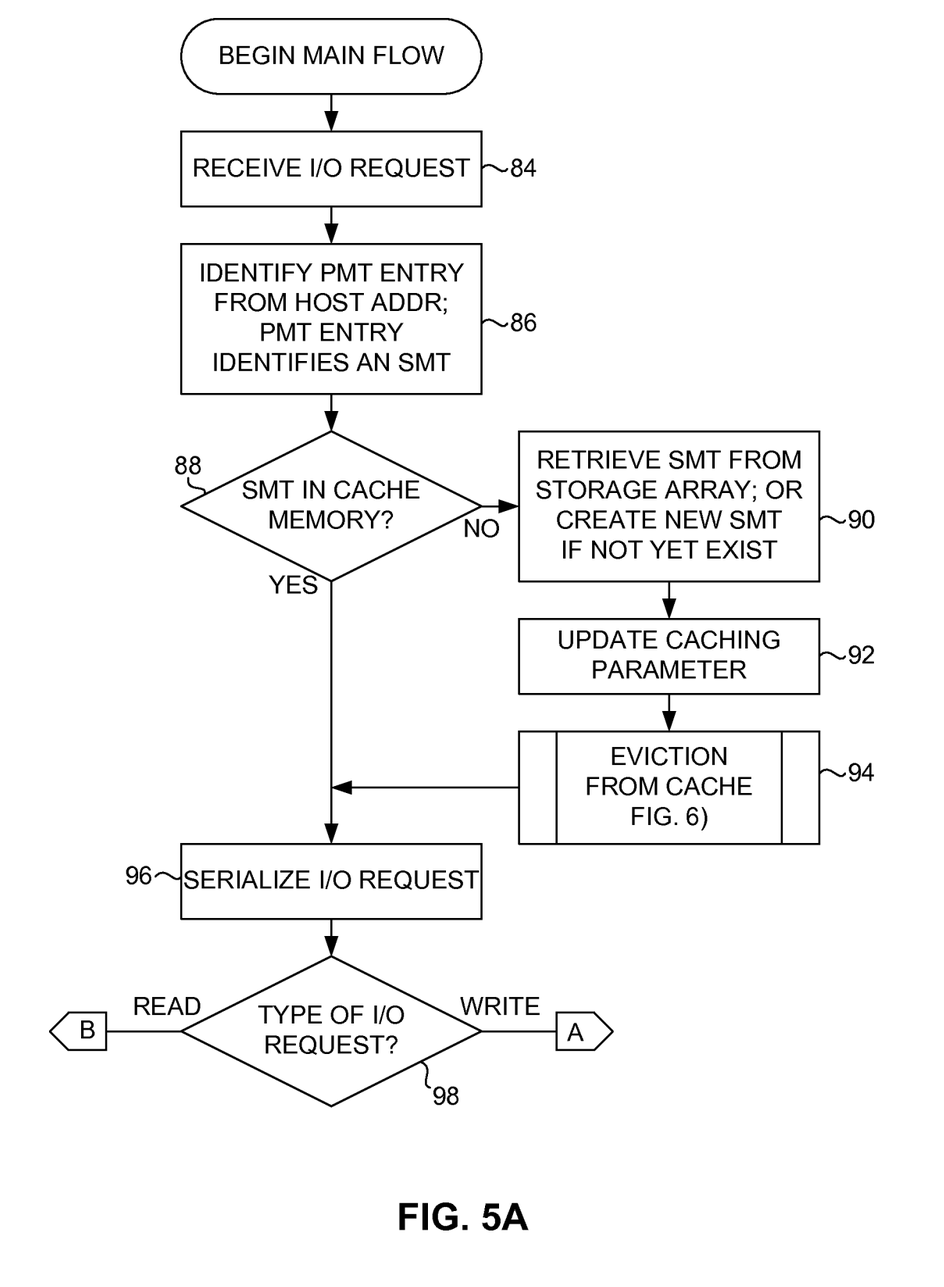
FIG. 5A is a flow diagram illustrating an aspect of a method of operation of the RAID controller of the system of FIG. 2, in accordance with the exemplary embodiment.
Figure 5B:
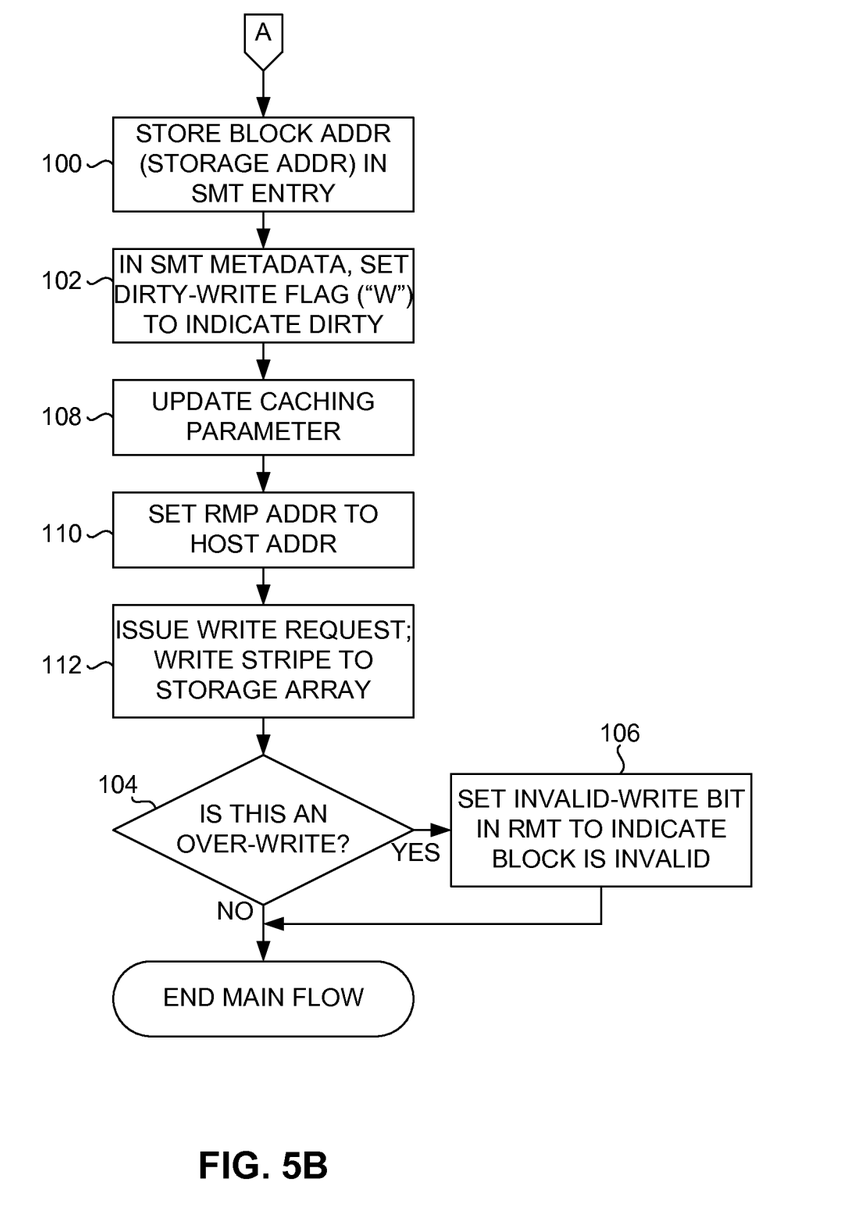
FIG. 5B is a continuation of the flow diagram of FIG. 5A.
Figure 5C:
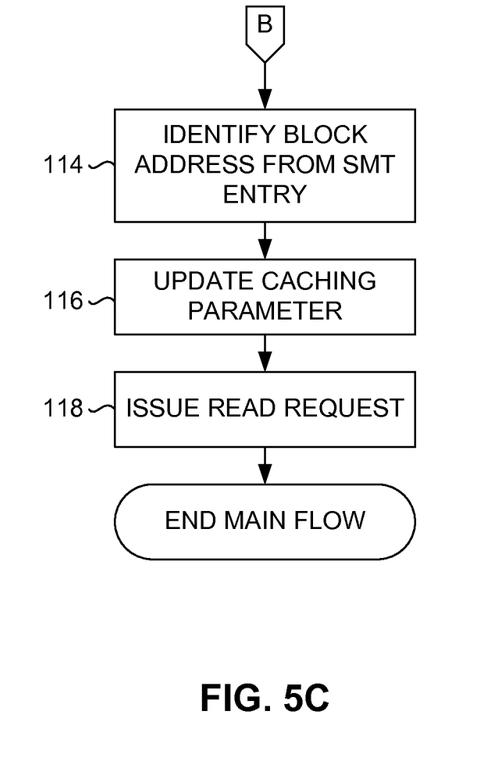
FIG. 5C is another continuation of the flow diagram of FIG. 5A.
Figure 6:
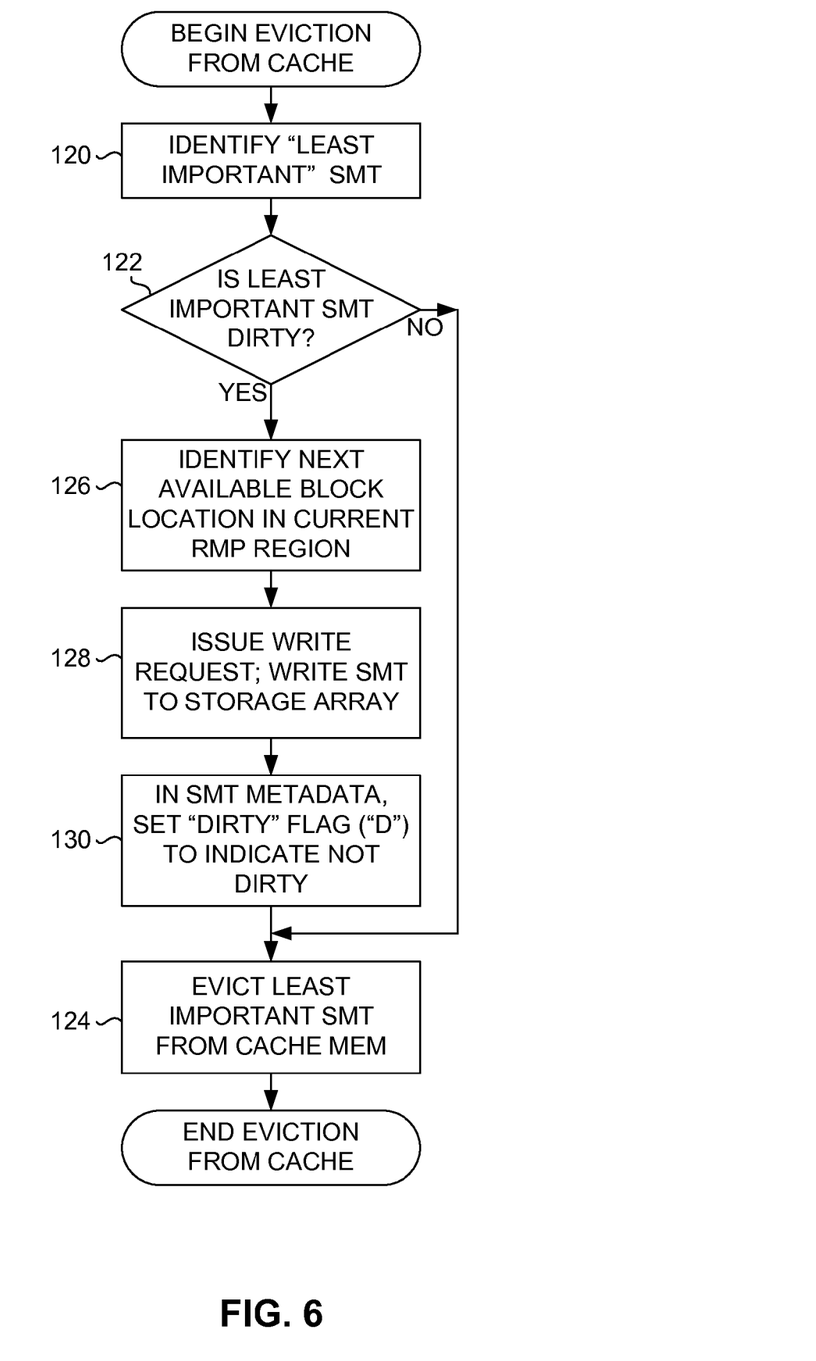
FIG. 6 is a flow diagram illustrating a cache eviction sub-method in the method illustrated by the flow diagram of FIGS. 5A-C.
Figure 7:
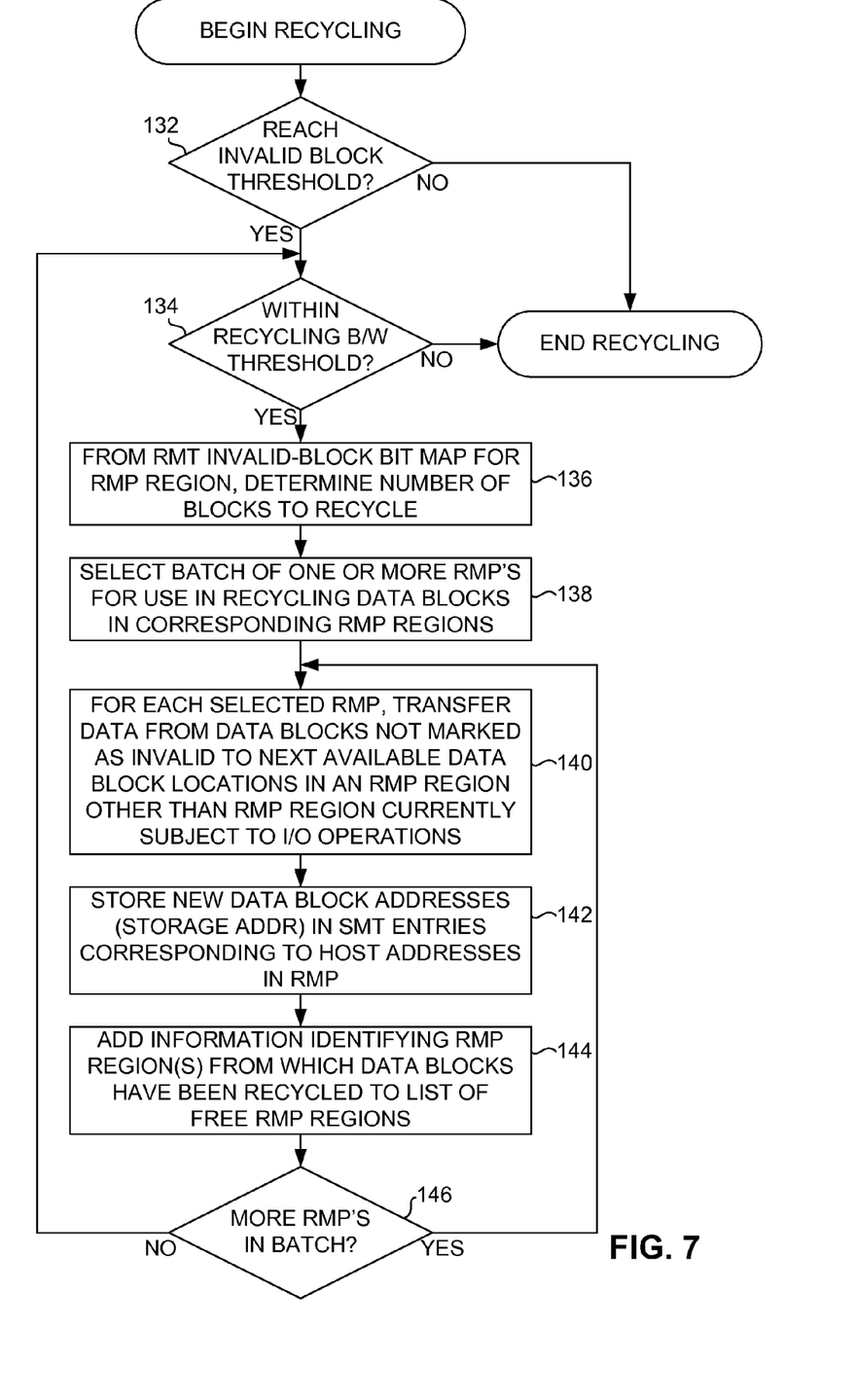
FIG. 7 is a flow diagram illustrating a recycling aspect of the method of operation of the RAID controller system of FIG. 2, in accordance with the exemplary embodiment.

Processing system 54 of storage controller 32 is programmed or otherwise configured to cause storage controller 32 to effect the methods represented by the flow diagrams of FIGS. 5-7. In view of the descriptions herein, persons skilled in the art will be capable of providing suitable programming (e.g., software, firmware, etc.) and otherwise configuring storage controller 32 to effect the methods described herein.

As illustrated in FIGS. 5A-C, a method of operation of the storage system begins with storage controller 32 (FIG. 2) receiving an input/output ("I/O") request from host system 30, as indicated by block 84. The I/O request can be either a write request or a read request. In a write request, storage controller 32 receives one or more data blocks and a host address at which host system 30 requests the data blocks be written. Although not shown in FIGS. 5A-C for purposes of clarity, in response to a write request storage controller 32 can cache or temporarily store the received data blocks in memory 58 in a conventional manner. As such conventional data caching aspects are well understood by persons skilled in the art, they are not described in further detail herein. Caching logic 62 (FIG. 2) includes logic to effect such conventional data caching.

As indicated by block 86, in response to a write request storage controller 32 also identifies a PMT entry in PMT 68 (FIG. 3) in response to the received host address. As described above with regard to FIG. 3, each PMT entry corresponds to one of the plurality of SMTs 70. As PMT 68 represents a partitioning of the total address space available to host system 30, a PMT entry (and thus a corresponding SMT 70) can be identified by dividing the host address (e.g., LBA) by the PMT partition size. In the example set forth above, PMT 68 is partitioned into 128 k PMT entries, each corresponding to one of SMTs 70. Thus, in an embodiment in which each SMT 70 has, for example, 1,024 entries, each representing, for example, an 8 kB data block location in storage array 34, each PMT entry represents 8 MB of storage or address space. Stated another way, in this example PMT 68 represents a partitioning of the total address space into 128k regions that are each 8 MB in size. Thus, storage controller 32 can use the host address to identify the corresponding PMT entry and thus the corresponding one of SMTs 70 by dividing the host address by 8 MB.

As indicated by block 88, storage controller 32 determines whether the identified one of SMTs 70 is cached in memory 58 by examining the state of the stored-in-memory flag "S" in the identified or corresponding PMT entry. A first state of the stored-in-memory flag "S" indicates that the identified SMT 70 is cached in memory 58, and a second state of the stored-in-memory flag "S" indicates that the identified SMT 70 is not cached (i.e., is not present or stored) in memory 58. If storage controller 32 determines that the identified SMT 70 is not cached in memory 58, then storage controller 32 reads or retrieves that SMT 70 from storage array 34, as indicated by block 90. Note that the contents of the "STOR ADDR" field in the SMT metadata node 76 (FIG. 3) identified by the "METADATA PTR" in the identified PMT entry is a pointer to or address of the block or page in storage array 34 in which the identified SMT 70 is stored. Thus, storage controller 32 can use SMT metadata node 76 in this manner to retrieve the identified SMT 70 from storage array 34 into memory 58. Note that if the host address has not yet been written to, storage controller 32 can create a new SMT 70 that can then serve as the identified SMT 70.

As indicated by block 92, storage controller 32 can update one or more caching parameters in conjunction with retrieving the identified SMT 70 from storage array 34 into memory 58. As well understood by persons skilled in the art, caching is a conventional principle used in data storage systems by which only the most frequently accessed items are maintained in the working memory for fast access by a processor, while the remaining items are left in a storage system that presumably takes the processor longer to access than the working memory and is typically larger than the working memory. When it is determined that an items is not frequently accessed, it can be removed or, in data caching terminology, "evicted" from the cache memory in accordance with a caching algorithm that compares the state of caching parameters with a threshold or other conditions. Frequency of access, sometimes referred to in data caching as "importance," is a common caching parameter. Accordingly, the caching parameters used by storage controller 32 can be any parameters that can be used by a suitable conventional caching method to determine when to evict an SMT 70 from memory 58, such as parameters relating to frequency of access or importance. As indicated by block 94, a sub-method relating to evicting a "least important" SMT 70 from memory 58 can be performed, as described below with regard to FIG. 6. Following completion of this eviction sub-method, the present method can continue as indicated by block 96. If it is determined (block 88) that the identified one of SMTs 70 is cached in memory 58, then the method continues as indicated by block 96.

Block 96 relates to serializing the I/O request. In the case of a write request, for example, storage controller 32 serializes the write request into a RAID stripe that includes the data block to be written. As described below, data is only written once a full RAID stripe has been formed. The serialized write information can be accumulated or formed in a queue (not shown) in memory 58 as additional I/O requests are received from host system 30. Serialization logic 60 (FIG. 2) relates to this serialization feature of storage controller 32. However, in other embodiments (not shown) such serialization can occur in the host system instead of the storage controller.

As indicated by block 98, the method of operation of storage controller 32 differs depending on whether the I/O request is a write or a read operation. In the case of a write operation (FIG. 5B), storage controller 32 stores the data block addresses (i.e., the storage locations in storage array 34 to which the data blocks in the stripe are to be written) in the "STORAGE ADDRESS" field (FIG. 2) of the identified SMT entry, as indicated by block 100. Storing the data block addresses in the identified SMT entry enables storage controller 32 to later read the data blocks from storage array 34 in response to a read request.

As indicated by block 102, storage controller 32 sets the dirty-write flag ("W") in the SMT metadata node 76 associated with the identified SMT 70 to a state indicating "dirty." This first state, "dirty," of the dirty-write flag indicates that the data blocks associated with the write request being processed have not yet been written to storage array 34. A second state, "not dirty," of the dirty-write flag indicates that the data blocks associated with the write request being processed have been written to storage array 34. RAID logic 64 (FIG. 1) can use the state of the dirty-write flag as an input in controlling the writing of the stripe containing the data blocks to storage array 34 in a conventional manner. As the managing of RAID operations to minimize the likelihood of loss of dirty write blocks is well understood in the art, such conventional aspects are not described herein in further detail.

Following block 102, as indicated by block 108, storage controller 32 can update one or more caching parameters associated with the identified SMT 70 if not previously updated per block 92.

As indicated by block 110, storage controller 32 stores the host address in the reverse map page address field ("HOST ADDR") of an RMP entry (FIG. 4) corresponding to the data block location in storage array 34 to which a data block is to be written. As described above, each RMP entry relates a storage location in storage array 34 to a host address. Each storage location in storage array 34, i.e., an address, points to one RMP entry in one of RMPs 80. If the requisite one of RMPs 80 having the RMP entry to which the storage location in storage array 34 points is not in memory 58, it is retrieved from storage array 34 into memory 58 in accordance with the above-referenced conventional caching or paging methods to which caching logic 62 (FIG. 2) relates. Note that RMPs 80 are similar to SMTs 70 in that both are types of metadata blocks that can be retrieved from storage array 34 into memory 58 on an as-needed basis in accordance with conventional caching or paging methods.

As indicated by block 112, storage controller 32 issues a write request to storage array 34, requesting that storage array 34 store the RAID stripe containing the data blocks received from host system 30. Although not shown for purposes of clarity, when storage array 34 has completed this write, storage controller 32 can reset the dirty-write flag ("W") in the SMT metadata node 76 associated with the identified SMT 70 to a state indicating "not dirty."

Following block 112, as indicated by block 104, storage controller 32 determines whether the write operation is an over-write operation, i.e., whether at least some of the data blocks are to be written to storage locations in storage array 34 that already contain valid data. Storage controller 32 can determine whether those storage locations in storage array 34 contain valid data by examining the "STORAGE ADDR" field in the identified SMT entry. The "STORAGE ADDR" field will only contain a storage address if that storage address or location in storage array 34 contains valid data. If a storage location in storage array 34 does not contain valid data, the "STORAGE ADDR" field in the identified SMT entry will contain a distinct value as a flag, such as all "FF"s (hexadecimal).

If storage controller 32 determines that the write operation is an over-write, then storage controller 32 sets a bit of the invalid-block bit map in RMTs 78 (FIG. 4) to a state indicating that the corresponding storage location contains an invalid data block, as indicated by block 106. As described above, each bit in the invalid-block bit map corresponds to a storage location in storage array 34. Each time a data block stored in one of those storage locations is replaced with another data block, the state of the corresponding bit in the invalid-block bit map is set to indicate that the data block stored in that storage location is no longer valid. It should be noted that the replacement data block is not written to the same storage location in which the invalidated data block is stored and thus does not literally "over-write" a data block. Rather, a data block that replaces a previously written data block is written to a different storage location, and the storage location of the previously written data block is marked invalid. As the storage system described herein only writes data in full RAID stripes, the replacement data block is written in a new stripe at the next available storage locations storage array 34 that can accommodate a stripe. The RAID logic 64 (FIG. 2) relates to the full-stripe write and other RAID-related aspects of the operation of storage controller 32. As the managing of RAID operations to write data blocks in full stripes is well understood in the art, such conventional aspects are not described herein in further detail.

In the case of a read operation (FIG. 5C), storage controller 32 obtains the data block address from the "STORAGE ADDR" field of the identified SMT entry, as indicated by block 114. As indicated by block 116, storage controller 32 can update one or more caching parameters associated with the identified SMT 70 if not previously updated per block 92. As indicated by block 118, storage controller 32 issues a read request to storage array 34, requesting that storage array 34 read one or more data blocks from storage locations in storage array 34. Although not shown for purposes of clarity, storage controller 32 then receives the data blocks that have been read from storage array 34 and transfers them to host system 30 in a conventional manner. Storage controller 34 can cache the data blocks in memory 58 in a conventional manner before transferring them to host system 30.

The above-referenced eviction method (block 94) is represented in further detail by the flow diagram of FIG. 6. As indicated by block 120, storage controller 32 determines which of SMTs 70 in memory 58 is "least important." Methods for determining which of a number of cached items is least important are known in the art, and any such conventional method can be employed in determining which of SMTs 70 in memory 58 is least important. As indicated by block 122, storage controller 32 then determines whether the SMT 70 that it has identified as least important is dirty by examining the state of the dirty-write flag "W" in the SMT metadata node 76 associated with that SMT 70. If storage controller 32 determines that the least important SMT 70 is not dirty, then storage controller 32 evicts that SMT 70 from memory 58, as indicated by block 124. Note that storage controller 32 can evict an SMT 70 by removing its metadata node 76 from the linked list. A metadata node 76 can be removed from the linked list by updating the previous-node and next-node pointers of neighboring metadata nodes 76.

If storage controller 32 determines that the least important SMT 70 is dirty, then storage controller 32 identifies the next available storage location in the current RMP region 82, as indicated by block 126. The "current" RMP region is the one of RMP regions 82 that has been the subject of recent I/O operations. It can be presumed likely that successive I/O operations involve addresses within one RMP region 82 rather than among several different RMP regions 82. As storage controller 32 only writes in full stripes, the next available storage location in the current RMP region is a storage location included in a stripe of storage array 34 that does not contain valid data.

As indicated by block 128, storage controller 32 then issues a write request to storage array 34, requesting that storage array 34 store the SMT 70. As storage controller 32 only writes in full stripes, the write may not be completed until storage controller 32 has formed or accumulated a full stripe, which may contain some combination of data blocks ("D") and metadata blocks ("M") as shown in FIG. 4. As indicated by block 130, when storage array 34 has completed this write, storage controller 32 sets the dirty-write flag ("W") in the SMT metadata node 76 associated with the least important SMT 70 to a state indicating "not dirty." The method then finishes as described above with regard to block 124, wherein the least important SMT 70 is evicted from memory 58.

A recycling method is represented by the flow diagram of FIG. 7. This method can occur periodically, as determined by a timer (not shown), or in response to any other suitable conditions. Recycling is a method in which valid data blocks are moved from an RMP region that also contains many invalid data blocks to a different RMP region that contains fewer or no invalid data blocks, thereby freeing up contiguous storage locations in storage array 34. As indicated by block 132, the method begins by storage controller 32 determining whether an invalid block threshold has been reached. Storage controller 32 can determine whether an invalid block threshold has been reached by summing the values contained in the invalid block count fields of all RMTs 78 (FIG. 4) and then comparing the sum with a threshold number. If the sum of the invalid block counts is less than the threshold, then recycling is not performed, and the method ends.

If storage controller 32 determines that the invalid block threshold has been reached, i.e., the above-referenced sum is greater than or equal to the threshold, then storage controller 32 determines whether the available processing bandwidth is within a threshold amount. That is, storage controller 32 determines whether it has sufficient bandwidth to recycle data blocks. As well understood by persons skilled in the art, recycling data blocks in a data storage array is commonly performed only when a processing system is not otherwise occupied with processing I/O requests or other high-priority tasks. Storage controller 32 can use any suitable conventional measure of available processing bandwidth, such as the number of I/O requests that have been queued and are awaiting processing by storage controller 32. If the available recycling bandwidth is less than the threshold, then recycling is not performed, and the method ends.

If storage controller 32 determines that it has sufficient bandwidth to perform recycling (e.g., the number of I/O requests awaiting processing is less than the threshold), then storage controller 32 performs recycling in the following manner. As indicated by block 136, storage controller 32 determines the number of blocks it is to recycle by examining the invalid block count word ("INVALID BLK CNT") in the one of RMTs 78 corresponding to the current RMP region.

As indicated by block 138, storage controller 32 selects an initial group or batch of one or more RMPs 80 to use in recycling data blocks in corresponding RMP regions 82. For example, the batch size can be a fixed number, and storage controller 32 can select that number of RMPs 80 in sequence, beginning with the RMP 80 at the lowest address and selecting RMPs 80 at successively higher addresses.

As indicated by block 134, for each selected RMP 80 in the batch, storage controller 32 transfers data from data blocks not marked as invalid to the next available storage locations in storage array 34 in an RMP region other than the current RMP region. For example, storage controller 32 can transfer data blocks to new storage locations in one of RMP regions 82 that has not been the subject of any I/O operations within some threshold period of time. Note that storage controller 32 can determine whether a data block is invalid by examining the above-described invalid-block bit map in the one of RMTs 78 corresponding to the RMP region 82 in which the data block is stored.

As indicated by block 142, for each data block transferred in the above-described manner to a new storage location, storage controller 32 stores a new data block address (i.e., storage location) in the storage address field ("STORAGE ADDR") of the SMT entry (FIG. 3) corresponding to the transferred data block. Stated another way, storage controller 32 updates the SMT entry to indicate the new storage address of the transferred data block in storage array 34. As each SMT entry corresponds to a host address, this maintains the ability of storage controller 32 to read the transferred data block from storage array 23 in response to a read request from host system 30 in the same manner as if the data block had not been transferred.

As indicated by block 144, storage controller 32 adds information identifying the RMP regions (or corresponding RMPs) from which data blocks have been recycled, i.e., transferred, to a list of free RMP regions (not shown). Storage controller 32 can maintain such a list of RMP regions that are free or available to store data blocks in response to write operations.

As indicated by block 146, storage controller 32 determines whether all RMPs 30 in the batch have been processed in the above-described manner. If storage controller 32 determines that the batch contains further RMPs 30 that have not been processed, the method continues as described above with regard to block 140. If storage controller 32 determines that the batch does not contain any further RMPs 30 that have not been processed, the method continues as described above with regard to block 132. That is, storage controller 32 continues to recycle data blocks so long as the total number of invalid blocks exceeds the threshold and storage controller 32 has sufficient bandwidth to process another batch of RMPs 30.

It should be understood that the flow diagrams of FIGS. 5A-C, 6 and 7 are intended only to be exemplary or illustrative of the logic underlying the described methods. Persons skilled in the art can appreciate that in various embodiments storage controller 32 can be programmed or configured in any of various ways to effect the described methods. In some embodiments, the steps or acts described above with regard to FIGS. 5A-C, 6 and 7 can occur in any suitable order or sequence, including in parallel or asynchronously with each other. Steps or acts described above can be combined with others or omitted in some embodiments. Although depicted for purposes of clarity in the form of three separate flow diagrams in FIGS. 5A-C, 6 and 7, the underlying logic can be modularized or otherwise arranged in any suitable manner. Persons skilled in the art will readily be capable of programming or configuring storage controller 32 with suitable software or in suitable logic, such as in the form of ASIC circuitry or other device circuitry, to effect the above-described methods. Also, it should be understood that the combination of software instructions or similar logic and memory 58 or other memory in which such software instructions or similar logic is stored or embodied for execution by processor 56 comprises a "computer-readable medium" or "computer program product" as that term is used in the patent lexicon.

It should be noted that the invention has been described with reference to one or more exemplary embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for accessing data in a redundant array of inexpensive disks (RAID) storage array, comprising:
   receiving a write request including a host address and a data block;
   identifying a primary map table entry in response to the host address, the primary map table having a plurality of primary map table entries, each primary map table entry identifying one of a plurality of secondary map tables;
   identifying a secondary map table in response to an identified primary map table entry identified by the host address, each secondary map table having a plurality of secondary map table entries, each secondary map table entry identifying a storage location in the RAID storage array;
   identifying an indicated secondary map table entry in response to the host address;
   serializing the write request into a RAID stripe including the data block;
   storing a block address in the identified secondary map table entry; and
   writing the RAID stripe including the data block to the RAID storage array, the block address stored in the identified secondary map table entry indicating a location of the data block in the RAID storage array.

2. The method of claim 1, further comprising storing the host address in a location in a reverse map table corresponding to the block address.

3. The method of claim 1, further comprising:
   storing the data block in a cache memory before writing the RAID stripe from the cache memory to the RAID storage array; and
   storing a dirty write indication in the identified secondary map table entry before writing the RAID stripe from the cache memory to the RAID storage array.

4. The method of claim 1, further comprising:
   determining prior to writing the RAID stripe to the RAID storage array if the identified secondary map table entry indicates previously written data stored at the logical block address in the RAID storage array; and
   storing an invalid block indicator in a reverse map table if the identified secondary map table entry is determined to indicate previously written data stored at the logical block address in the RAID storage array.

5. The method of claim 1, further comprising:
   determining prior to storing the block address in the identified secondary map table entry whether a secondary map table identified as containing the identified secondary map table entry is in a cache memory; and
   retrieving the identified second map table from the storage array if it is determined that the identified secondary map table is not in the cache memory.

6. The method of claim 5, further comprising:
   identifying a least important secondary map table in the cache memory; and
   removing the least important secondary map table from the cache memory.

7. The method of claim 6, further comprising:
   determining whether the least important secondary map table stored in the cache memory is also stored in the storage array; and
   storing the least important secondary map table in the storage array before removing the least important secondary map table from the cache memory if it is determined that the least important secondary map table is not also stored in the storage array.

8. The method of claim 1, further comprising:
   receiving a read request including a host address; and
   reading a data block in the RAID storage array at a block address in the identified secondary map table entry in response to the read request.

9. The method of claim 1, further comprising:
   storing the host address in a location in a reverse map table corresponding to the block address;
   determining prior to writing the RAID stripe to the RAID storage array if the identified secondary map table entry indicates previously written data stored at the logical block address in the RAID storage array;
   storing an invalid block indicator in a reverse map table if the identified secondary map table entry is determined to indicate previously written data stored at the logical block address in the RAID storage array;
   identifying a group of contiguous data blocks for recycling; and
   transferring from the group of contiguous data blocks a data block not corresponding to an invalid block indicator in the reverse map table to a storage location not in the group of contiguous data blocks.

10. A system, comprising:
a redundant array of inexpensive disks (RAID) storage array; and
a storage controller having processing system comprising one or more processors and a memory, the processing system programmed or configured to:
  receive a write request including a host address and a data block;
  identify a primary map table entry in response to the host address, the primary map table having a plurality of primary map table entries, each primary map table entry identifying one of a plurality of secondary map tables;
  identify a secondary map table in response to an identified primary map table entry identified by the host address, each secondary map table having a plurality of secondary map table entries, each secondary map table entry identifying a storage location in the RAID storage array;
  identify an indicated secondary map table entry in response to the host address; serialize the write request into a RAID stripe including the data block;
  store a block address in the identified secondary map table entry; and
  write the RAID stripe including the data block to the RAID storage array, the block address stored in the identified secondary map table entry indicating a location of the data block in the RAID storage array.

11. The system of claim 10, wherein the processing system of the storage controller is further programmed or configured to store the host address in a location in a reverse map table corresponding to the block address.

12. The system of claim 10, wherein the processing system of the storage controller is further programmed or configured to:
  store the data block in a cache memory before writing the RAID stripe from the cache memory to the RAID storage array; and
  store a dirty write indication in the identified secondary map table entry before writing the RAID stripe from the cache memory to the RAID storage array.

13. The system of claim 10, wherein the processing system of the storage controller is further programmed or configured to:
  determine prior to writing the RAID stripe to the RAID storage array if the identified secondary map table entry indicates previously written data stored at the logical block address in the RAID storage array; and
  store an invalid block indicator in a reverse map table if the identified secondary map table entry is determined to indicate previously written data stored at the logical block address in the RAID storage array.

14. The system of claim 10, wherein the processing system of the storage controller is further programmed or configured to:
  determine prior to storing the block address in the identified secondary map table entry whether a secondary map table identified as containing the identified secondary map table entry is in a cache memory; and
  retrieve the identified second map table from the storage array if it is determined that the identified secondary map table is not in the cache memory.

15. The system of claim 14, wherein the processing system of the storage controller is further programmed or configured to:
  identify a least important secondary map table in the cache memory; and
  remove the least important secondary map table from the cache memory.

16. The system of claim 15, wherein the processing system of the storage controller is further programmed or configured to:
  determine whether the least important secondary map table stored in the cache memory is also stored in the storage array; and
  store the least important secondary map table in the storage array before removing the least important secondary map table from the cache memory if it is determined that the least important secondary map table is not also stored in the storage array.

17. The system of claim 10, wherein the processing system of the storage controller is further programmed or configured to:
  receive a read request including a host address; and
  read a data block in the RAID storage array at a block address in the identified secondary map table entry in response to the read request.

18. The system of claim 10, wherein the processing system of the storage controller is further programmed or configured to:
  store the host address in a location in a reverse map table corresponding to the block address;
  determine prior to writing the RAID stripe to the RAID storage array if the identified secondary map table entry indicates previously written data stored at the logical block address in the RAID storage array;
  store an invalid block indicator in a reverse map table if the identified secondary map table entry is determined to indicate previously written data stored at the logical block address in the RAID storage array;
  identify a group of contiguous data blocks for recycling; and
  transfer from the group of contiguous data blocks a data block not corresponding to an invalid block indicator in the reverse map table to a storage location not in the group of contiguous data blocks.

19. A computer program product comprising a computer readable medium having stored thereon in computer executable non-transitory form instructions that, when executed on a processing system of a redundant array of inexpensive disks (RAID) storage controller, cause the processing system to:
  receive a write request including a host address and a data block;
  identify a primary map table entry in response to the host address, the primary map table having a plurality of primary map table entries, each primary map table entry identifying one of a plurality of secondary map tables;
  identify a secondary map table in response to an identified primary map table entry identified by the host address, each secondary map table having a plurality of secondary map table entries, each secondary map table entry identifying a storage location in the RAID storage array;
  identify an indicated secondary map table entry in response to the host address;
  serialize the write request into a RAID stripe including the data block;
  store a block address in the identified secondary map table entry; and
  write the RAID stripe including the data block to the RAID storage array, the block address stored in the identified secondary map table entry indicating a location of the data block in the RAID storage array.

20. The computer program product of claim 19, further comprising instructions that, when executed on the processing system, cause the processing system to store the host address in a location in a reverse map table corresponding to the block address.

21. The computer program product of claim 19, further comprising instructions that, when executed on the processing system, cause the processing system to:
store the data block in a cache memory before writing the RAID stripe from the cache memory to the RAID storage array; and
store a dirty write indication in the identified secondary map table entry before writing the RAID stripe from the cache memory to the RAID storage array.

22. The computer program product of claim 19, further comprising instructions that, when executed on the processing system, cause the processing system to:
determine prior to writing the RAID stripe to the RAID storage array if the identified secondary map table entry indicates previously written data stored at the logical block address in the RAID storage array; and
store an invalid block indicator in a reverse map table if the identified secondary map table entry is determined to indicate previously written data stored at the logical block address in the RAID storage array.

23. The computer program product of claim 19, further comprising instructions that, when executed on the processing system, cause the processing system to:
determine prior to storing the block address in the identified secondary map table entry whether a secondary map table identified as containing the identified secondary map table entry is in a cache memory; and
retrieve the identified second map table from the storage array if it is determined that the identified secondary map table is not in the cache memory.

24. The computer program product of claim 23, further comprising instructions that, when executed on the processing system, cause the processing system to:
identify a least important secondary map table in the cache memory; and
remove the least important secondary map table from the cache memory.

25. The computer program product of claim 24, further comprising instructions that, when executed on the processing system, cause the processing system to:
determine whether the least important secondary map table stored in the cache memory is also stored in the storage array; and
store the least important secondary map table in the storage array before removing the least important secondary map table from the cache memory if it is determined that the least important secondary map table is not also stored in the storage array.

26. The computer program product of claim 19, further comprising instructions that, when executed on the processing system, cause the processing system to:
receive a read request including a host address; and
read a data block in the RAID storage array at a block address in the identified secondary map table entry in response to the read request.

27. The computer program product of claim 19, further comprising instructions that, when executed on the processing system, cause the processing system to:
store the host address in a location in a reverse map table corresponding to the block address;
determine prior to writing the RAID stripe to the RAID storage array if the identified secondary map table entry indicates previously written data stored at the logical block address in the RAID storage array;
store an invalid block indicator in a reverse map table if the identified secondary map table entry is determined to indicate previously written data stored at the logical block address in the RAID storage array;
identify a group of contiguous data blocks for recycling; and
transfer from the group of contiguous data blocks a data block not corresponding to an invalid block indicator in the reverse map table to a storage location not in the group of contiguous data blocks.

* * * * *